(12) United States Patent
Harada

(10) Patent No.: US 7,406,571 B2
(45) Date of Patent: Jul. 29, 2008

(54) MEMORY SYSTEM AND METHOD FOR CONTROLLING THE SAME, AND METHOD FOR MAINTAINING DATA COHERENCY

(75) Inventor: Nobuyuki Harada, Sagamihara (JP)

(73) Assignee: International Business Machines Corporation, Armonk, NY (US)

( * ) Notice: Subject to any disclaimer, the term of this patent is extended or adjusted under 35 U.S.C. 154(b) by 262 days.

(21) Appl. No.: 11/276,004

(22) Filed: Feb. 9, 2006

(65) Prior Publication Data

US 2006/0095683 A1 May 4, 2006
US 2007/0186051 A1 Aug. 9, 2007

(51) Int. Cl.
*G06F 12/00* (2006.01)
(52) U.S. Cl. ........................................ 711/152; 711/146
(58) Field of Classification Search .................. None
See application file for complete search history.

(56) References Cited

U.S. PATENT DOCUMENTS

| 5,355,467 | A | * | 10/1994 | MacWilliams et al. | ...... 711/146 |
| 5,617,556 | A | * | 4/1997 | Baumgartner et al. | ....... 711/141 |
| 6,216,193 | B1 | * | 4/2001 | Lai et al. | ..................... 710/308 |
| 6,275,885 | B1 | * | 8/2001 | Chin et al. | .................. 710/311 |
| 6,732,236 | B2 | * | 5/2004 | Favor | .......................... 711/118 |
| 2007/0186051 | A1 | * | 8/2007 | Harada | ....................... 711/141 |

\* cited by examiner

*Primary Examiner*—Brian R Peugh
(74) *Attorney, Agent, or Firm*—Michael J. LeStrange

(57) ABSTRACT

A memory system including a bus 10, 11, a memory 17, a memory controller 16, a first device 13 having a cache, and a second device 15, all connected to the bus, wherein the memory controller includes a buffer 20 for temporarily storing cache data and write data that the second device writes in the memory. The buffer of the memory controller temporarily stores cached data and the write data to be written on write access to the memory by the second device, which enables maintenance of data coherency while avoiding a write access retry by the second device.

13 Claims, 3 Drawing Sheets

(a)

(b)

(c)

(d)

MEMORY SYSTEM AND METHOD FOR CONTROLLING THE SAME, AND METHOD FOR MAINTAINING DATA COHERENCY

FIELD OF THE INVENTION

The present invention generally relates to a memory system and a method for controlling the memory system and, in particular, to a method for improving the efficiency of write access to a memory through a bus while maintaining data coherency.

BACKGROUND OF THE INVENTION

In personal computers systems (PCs), a CPU and a memory (such as a DRAM) are interconnected through a bus. Each device acts as a master device (bus master) to access the memory in which data is stored. While such memories (system memories) configured as DRAMs have a large storage capacity, they provide slower access performance. In order to achieve faster access to frequently used data, a CPU uses a cache memory (hereinafter "cache") implemented by a memory such as an SRAM. Although a cache has a smaller storage capacity than a DRAM system memory, it can provided faster access then DRAM system memory.

In a system having a cache, coherency between the cache and the main memory (data consistency) must be maintained. One algorithm for maintaining data coherency is a snooping algorithm. FIG. 1 is a diagram for illustrating a conventional snoop operation. In FIG. 1, a CPU bus 1 and a system bus 2 are interconnected through a bus bridge 3. CPU #0 and CPU #2 are coupled onto CPU bus 1. Each of the two CPUs has a cache. Coupled onto system bus 2 are a device #2, a memory controller, and a memory.

According to the snooping algorithm, CPU #0 having a cache watches (snoops 5) for the address of data access 4 from another device #2 (master device) (FIG. 1(a)). CPU #0 issues a retry request 6 only if the access address matches the address of data in the cache of CPU #0 and the state of the data has been changed (updated) in accordance with a protocol such as the standard MESI protocol (FIG. 1(b)). In response to the retry request 6, in-progress access from the master device #2 is aborted (FIG. 1(b)). Furthermore, a cache line consisting of multiple data at contiguous addresses, including a matching address, in the cache is first written back to the memory (FIGS. 1(c) and 1(d)). Then, master device #2 accesses the memory again to transfer data, thereby maintaining the coherency of the data (FIGS. 1(e) and 1(f)).

As can be seen from the operation shown in FIG. 1, if a retry request is issued from a watched (snooped) device, a device that is transferring data must abort the access and then make access again. This means that additional operational delay due to a snoop hit on the write access decreases the bus utilization rate and increases the latency for the device and the performance of the memory system a whole.

A conventional technique for increasing memory access rate in a multiprocessor system using the snooping approach has been disclosed in Japanese Published Unexamined Patent Application No. 06-222993, for example, which is incorporated herein by reference. However, the published Unexamined Patent Application does not disclose a technique for reducing operation delay or alleviating decrease in bus utilization rate due to an access retry on a snoop hit.

SUMMARY OF THE INVENTION

An object of the present invention is to improve the efficiency of memory access, including write access, while maintaining data coherency.

Another object of the present invention is to alleviate problems such as operation delay and decrease in bus utilization rate due to operational latency occurring during an access retry when a cache hit (snoop hit) occurs on write access in snoop mode.

The present invention provides a memory system including: a bus; and a memory, a memory controller, a first device having a cache, and a second device which are connected to the bus; wherein the memory controller includes a buffer for temporarily storing cache data and write data that the second device writes in the memory.

The present invention can avoid a write access retry by a second device while maintaining data coherency by temporarily storing, in the buffer of the memory controller, cache data and write data to be written on write access to a memory by the second data.

The present invention can avoid write access retries and accordingly can alleviate operational delay and the concomitant decrease in bus utilization rate caused by access retry operations.

The novel features believed to be characteristic of this invention are set forth in the appended claims. The invention itself, however, as well as other objects and advantages thereof, may be best understood by reference to the following detailed description of an illustrated preferred embodiment to be read in conjunction with the accompanying drawings.

DETAILED DESCRIPTION OF THE PREFERRED EMBODIMENTS

Figure 2:
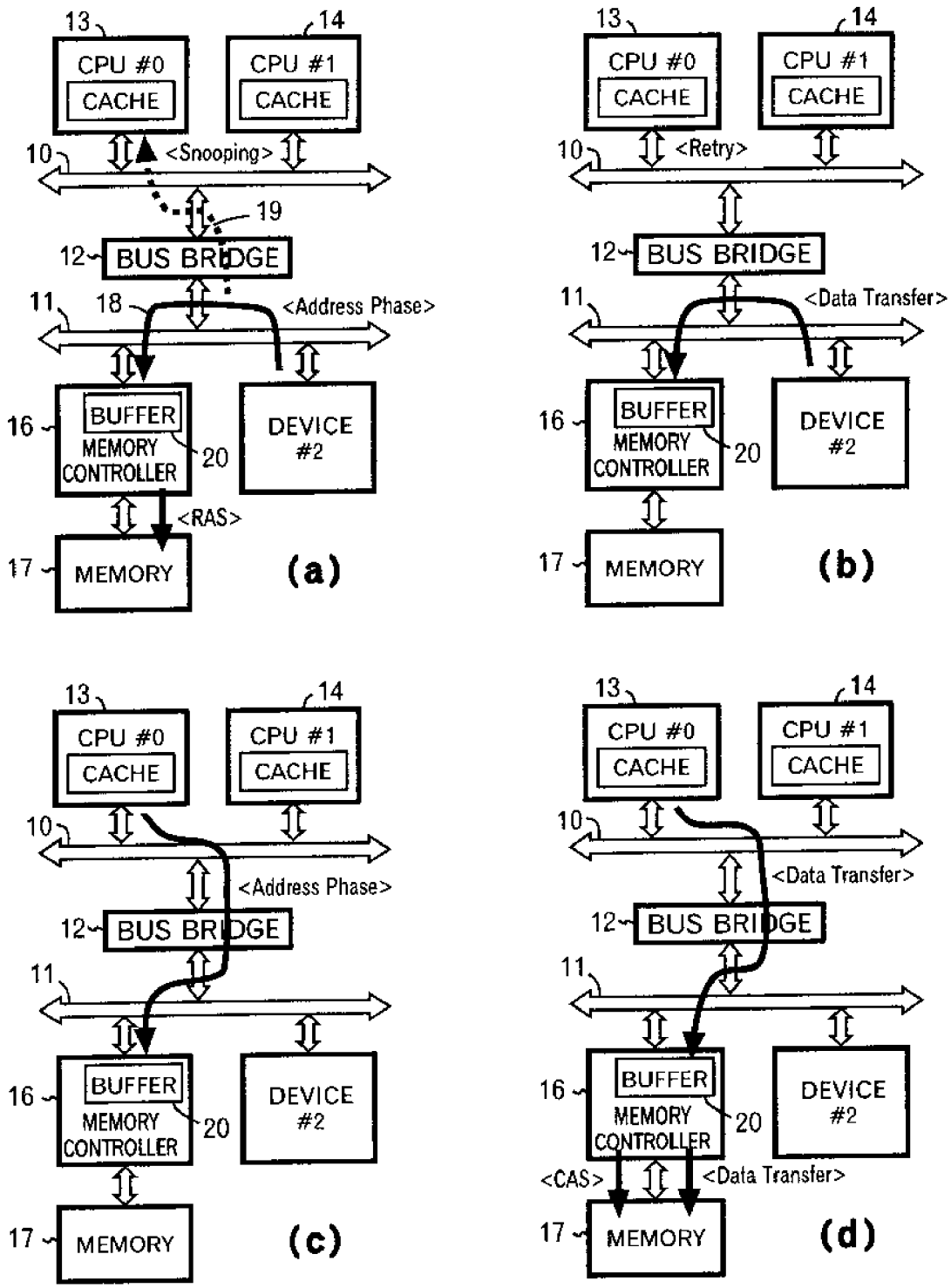
FIG. 2 depicts a schematic diagram illustrating a sequence of operations of a memory system according to a preferred embodiment.

The present invention will be described with reference to the accompanying drawings. FIG. 2 is a diagram for illustrating an overview of a method (operation) of the present invention. In FIG. 2, a CPU bus 10 and a system bus 12 is interconnected through a bus bridge 13. Coupled onto the CPU bus 10 are CPU #0 (13) and CPU #2 (14). Each of the two CPUs has a cache. Coupled onto the system bus 12 are a device #2 (15), a memory controller (16) and a memory (17). The memory (17) is a system memory such as a DRAM. The memory controller (16) has a buffer 20 for temporarily storing data. While the configuration in FIG. 2 includes the two buses, the CPU bus 10 and system bus 12, a configuration in which devices are coupled onto one system bus may be used. Furthermore, any number of devices may be connected to a bus, provided that at least two master devices that can occupy the bus are connected to the bus.

In a snooping algorithm, CPU #0 (13) having a cache monitors (snoops 19) for the address of data access 18 from another master device #2 (15) (FIG. 2(a)). If the access address matches the address of data in the cache of the CPU #0 (13) and the state of the data has been changed (updated)

in accordance with a protocol such as the standard MESI protocol, CPU #0 (13) issues a retry request 6. However, master device #2 (15) does not abort in-progress access. Device #2 (15) writes write data in the buffer 20 in the memory controller (FIG. 2(b)). Data at the matching address in the cache of CPU #0 is written back into the buffer 20 (FIGS. 2(c) and 2(d)). Then, the write data and the cache data in the buffer 20 are written in the memory (17) as a single piece of contiguous data (FIG. 2(d)).

Figure 1:
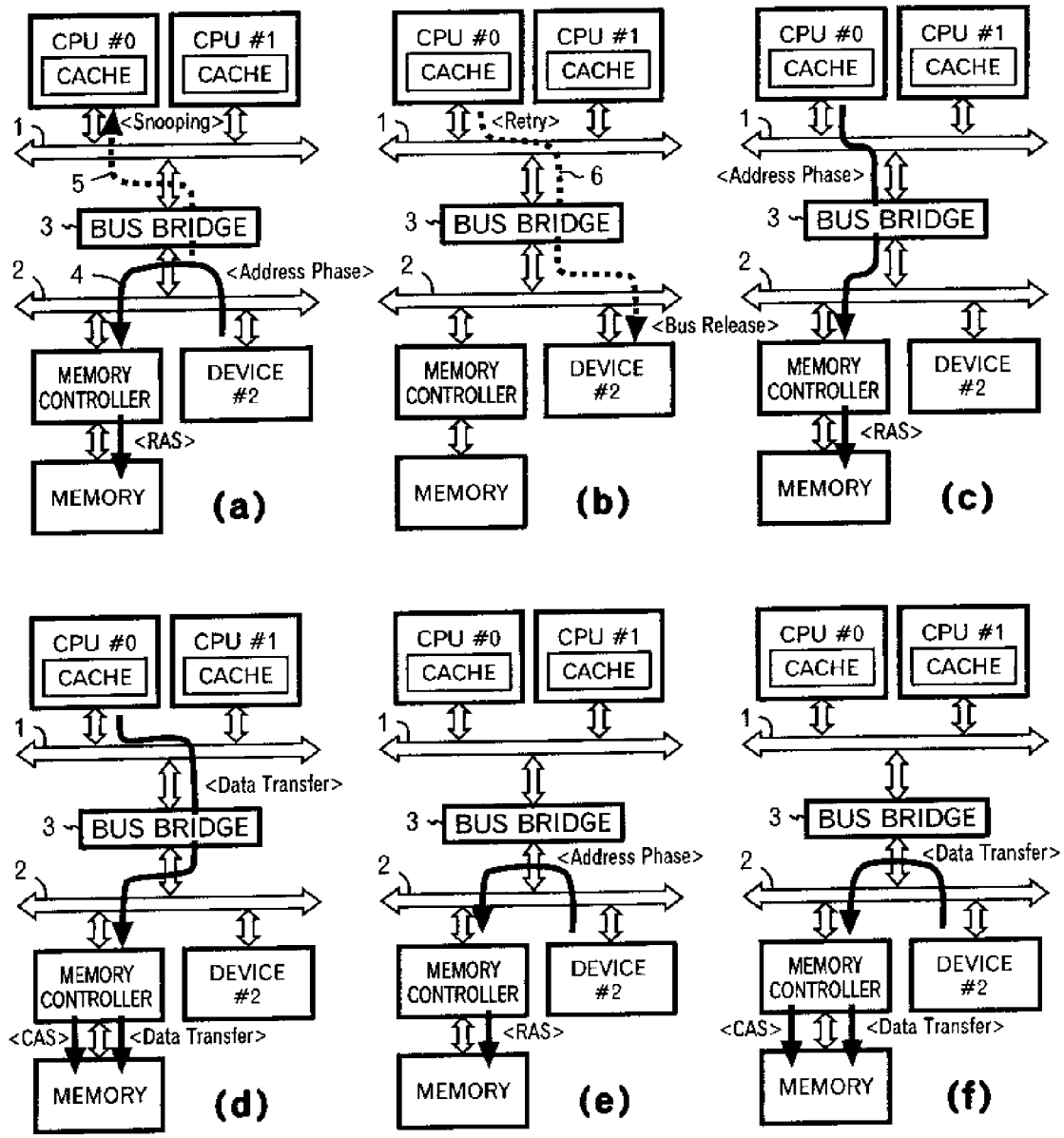
FIG. 1 illustrates a schematic diagram of a prior art snoop operation for a computer system with distributed memory.

In this way, the present invention does not require termination of bus access associated with a retry request due to a snoop hit on write access. Data coherency is maintained by temporarily storing cache data in the buffer of the memory controller before writing back the cache data. This can reduce the number of arbitration and address phases on the system bus 11, as compared with the conventional method shown in FIG. 1. Furthermore, the number of RAS address transfer periods, which would otherwise be three, the number of CAS address transfer periods, which would be two, and the number of data transfer periods, which would be two (when a transfer period of successive data is considered as one period) on the memory bus between the memory controller 16 and the memory 17 can each be reduced to one. The access time between the start and completion of write access can be reduced by approximately 20 to 30%, depending on the bus architecture and memory speed.

Figure 3:
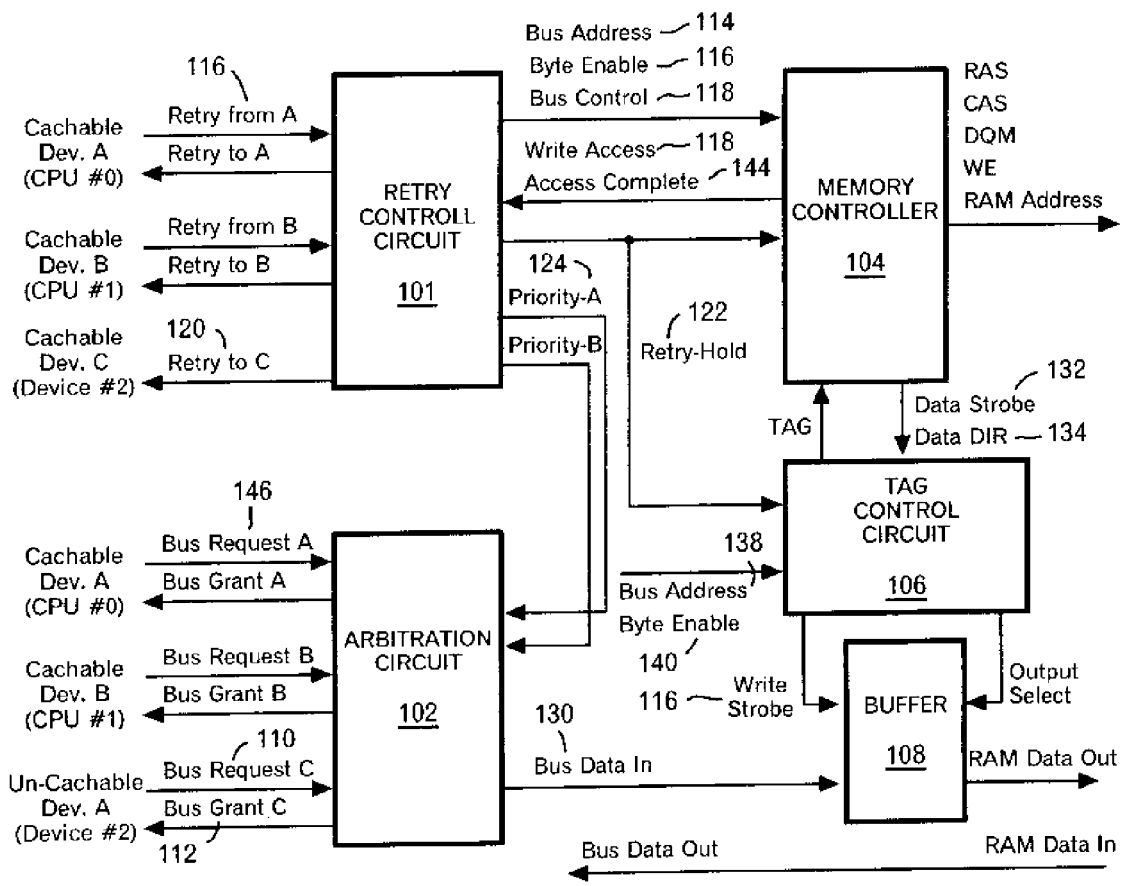
FIG. 3 depicts a functional block diagram of illustrating a configuration of a memory system according to the preferred embodiment.

FIG. 3 is a block diagram showing a configuration of the present invention. FIG. 3 contains a retry control circuit 101, an arbitration circuit 102, a memory controller 104, a tag control circuit 106, and a buffer 108. It should be noted that while the tag control circuit 106 and the buffer 108 are contained in the memory controller 104 in practice, they are indicated as separate blocks for purposes of illustration. All of these circuits are coupled onto a system bus (11 in FIG. 2).

The retry control circuit 101 watches for an address retry signal and delivers it to another device. If a retry signal is input due to a snoop hit on write access, a Retry-Hold signal and its associated Priority signal are asserted without asserting a retry output. If a snoop hit does not occur on write access, a retry input is outputted as a retry output without change. The arbitration circuit 102 has the function of giving the highest priority to a request from a device in response to a Priority signal from the retry control circuit 101. In the absence of a Priority signal, the arbitration circuit 102 performs normal arbitration. The memory controller 104 provides timing control for the memory. The memory controller 104 may be a conventional DRAM control circuit. After the completion of access, the memory controller 104 outputs an Access Complete signal.

The tag control circuit 107 records the location in the buffer 108 of write data when a snoop hit occurs. The unit of data in the buffer 108 is equal to the size of a cache line (32 bytes, for example). Accordingly, if the size of a cache line is 32 bytes, a corresponding position of the low-order 5 bits (the fifth power of 2=32) is recorded as the data location. The tag control circuit 106 also generates a Write Strobe signal for writing the subsequent data from the cache (cache-out data) in addition to the write data in the buffer 108. The tag control circuit 106 also generates an Output Select signal for writing cache-out data in the memory after the cache-out data is latched in the buffer 108. The buffer 108 latches data (write data or cache-out data) on the bus in response to a Write Strobe signal from the tag control circuit 106. The buffer 108 provides the latched data to the memory in response to the Output Select signal.

Description of the signals shown in FIG. 3 is given below.

Retry-Hold: Indicates that a retry on write access has been accepted. This signal is cleared on the completion of cache-out access.

Priority-X: When a retry on a write access is accepted, this signal gives the highest priority to the device X that issued the retry so that the device X accesses next.

Access Complete: Indicates the end of a memory access cycle.

Data Strobe: A timing signal for data input from the bus and data output to the memory.

Data DIR: indicates a data transfer direction.

Write Strobe: Specifies the byte to be latched by an address and byte-enable.

Output Select: Specifies data to be output on a memory write.

Bus Request: A bus request signal from a device.

Bus Grant: A bus grant signal to a device.

Retry from X: A retry signal from device X having a cache.

Retry to X: A retry signal to device X.

Operation of the present invention in the configuration shown in FIG. 3 will be described below.

Device C (Device #2) provides a Bus Request C signal (110) to the arbitration circuit 102 and receives a Bus Grant C signal (112) in response. It also provides an address (Bus Address 114) onto the bus in order to write data in the memory.

The cache of each of the devices such as device A (CPU #0) watches (snoops) for an address on the bus (Bus address 114).

If an address in the cache of device A (CPU #0) is hit (snoop hit), device A (CPU #0) activates a Retry from A signal (116) to the retry control circuit 101.

The retry control circuit 101 receives from the memory controller 104 a Write access signal (118) indicating that the access from device C (Device #2) is a write access. Even though the retry control circuit 101 receives the Retry from A signal (116), the retry control circuit 101 does not activate a Retry to C signal (120), which is a signal for aborting write access from device C.

The retry control circuit 101 activates a Retry Hold signal (122) to the tag control circuit 106. The retry control circuit 101 also sends (activates) to the arbitration circuit 102 a Priority-A signal (124) associated with device A (CPU #0) from which it received the Retry from A signal (116).

Device C (Device #2) uses a Bus Address signal (114), a Byte Enable signal (126), and a Bus Control signal (128) to control the memory controller 104 to write write data provided on the Bus Data In (130) into the buffer 108. A write location is specified by a Write Strobe signal (136), which is provided from the tag control circuit 106 in response to a Data Strobe signal and a Data DIR signal (134) from the memory controller 104. In particular, the write location depends on the low-order 5 bits (in the case of a 32-byte cache line) of the Bus Address (138) and the data width of a Byte Enable signal (140). Byte position information written in the tag control circuit 106 is recorded at this point of time.

Because the memory controller 104 has received the Retry Hold signal (122), the memory controller 104 waits for cache (data) out from the cache without writing data into the memory. On the completion of the write to the buffer 108 by device C (Device #2), the memory controller 104 activates an Access Complete signal (144).

Device A (CPU #0), which has requested a Retry, requests cache out. The arbitration circuit 102, which has received the Priority-A signal (124), gives the highest priority to the Bus Request A (146) from device A (CPU #0). The cache out request from device A (CPU #0) is accepted immediately after access by device C (Device #2).

Device A (CPU #0) caches out the snoop hit data into the buffer 108. The write location is determined in such a manner that the data previously written by device C is not overwritten by the Write Strobe signal 136.

On the completion of write to the buffer 108 by device A (CPU #0), the memory controller 104 provides an Access Complete signal (144) to the retry control circuit 101.

The retry control circuit 101 inactivates the activated Retry-Hold signal (122) and Priority-A signal (124).

The memory controller 104 writes data (write access data and cache-out data) latched in the buffer 108 into the memory as a sequence of data on the basis of address (TAG) information from the tag control circuit 106. This completes the write access operation while maintaining the data coherency.

While the invention has been described with reference to a preferred embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A memory system comprising:
a bus;
a memory, a memory controller, a first device having a cache, and a second device which are connected to the bus,
wherein the memory controller includes a buffer for temporarily storing a cache data and a write data that the second device writes in the memory; and
a retry control circuit for causing the write data to be temporarily stored in the buffer if a cache hit occurs in which the write data matches the cache data, the retry control circuit preventing the second device from performing a retry in response to an access retry request from the first device if the cache hit occurs.

2. The memory system according to claim 1, further comprising a tag control circuit for storing a write location of the write data written in the buffer and causing the cache data to be temporarily stored in the buffer without overwriting the write data in the write location in the buffer.

3. The memory system according to claim 2, wherein the cache data to be temporarily stored in the buffer is data which has been updated in the cache.

4. The memory system according to claim 1, wherein the tag control circuit causes the write data and the cache data stored in the buffer to be stored in the memory as sequential data.

5. The memory system according to claim 1, wherein the bus includes a CPU local bus and a system bus which are interconnected through a bus bridge, and the first device includes a CPU connected to the CPU local bus.

6. In a memory system comprising a bus, and a memory, a memory controller, a first device having a cache, and a second device which are connected to the bus, a method for controlling the memory system when the second device makes write access to the memory, comprising the steps of:
(a) comparing the address of a write data with the address of data in the cache;
(b) if the address of the write data and the address of the cache data match each other, determining whether or not data stored at the matching address in the cache has been changed;
(c) if the data has been changed, temporarily storing the write data in the buffer without allowing the second device to make a retry access;
(d) temporarily storing the changed data contained in the cache into the buffer without overwriting the write data temporarily stored in the buffer; and
(e) writing the changed data and the write data which are temporarily stored in the buffer into the memory as sequential data.

7. The method according to claim 6, wherein the comparing step (a) comprises the step of the cache of the first device monitoring whether the second device performs a write access.

8. In a system in which a memory, a memory controller having a buffer, a plurality of bus masters, and a cache memory are interconnected through a bus, a method for maintaining data coherency by using a snooping algorithm, comprising the step of:
if a write access by a bus master results in a snoop hit and the hit data in the cache memory has been updated, storing temporarily the write data of the bus master and the updated data in the cache memory into the buffer and then writing the write data and the updated data in the memory as sequential data, without executing an access retry by the bus master.

9. A distributed memory system, comprising:
a first device having a cache memory;
a first bus coupled to the first device;
a second bus adapted to interface with a plurality of devices;
a bus bridge interconnecting the first bus and the second bus;
a system memory coupled to the second bus;
a second device coupled to the second bus;
a memory controller coupled to the second bus and including a buffer for temporarily storing a cache data and a write data the second device writes in the system memory; and
a retry control circuit for causing the write data to be temporarily stored in the buffer if a cache hit occurs in which the write data matches the cache data, the retry control circuit preventing the second device from performing a retry in response to an access retry request from the first device if the cache hit occurs.

10. The memory system according to claim 9, further comprising a tag control circuit for storing a write location of the write data written in the buffer and causing the cache data to be temporarily stored in the buffer without overwriting the write data in the write location in the buffer.

11. The memory system according to claim 10, wherein the cache data to be temporarily stored in the buffer is data which has been updated in the cache.

12. The memory system according to claim 10, wherein the tag control circuit causes the write data and the cache data stored in the buffer to be stored in the memory as sequential data.

13. The memory system according to claim 9, wherein the first bus comprises a CPU local bus and the second bus comprises a system bus interconnected through the bus bridge, and the first device includes a CPU connected to the CPU local bus.

* * * * *